United States Patent [19]
> Hall

[11] 3,949,429
[45] Apr. 13, 1976

[54] ANIMAL COMMODE
[76] Inventor: John O. Hall, 4210 Centre Ave., Pittsburgh, Pa. 15213
[22] Filed: Aug. 16, 1973
[21] Appl. No.: 388,936

[52] U.S. Cl. ................................. 4/10; 4/6; 4/239
[51] Int. Cl.² ................. A47K 13/00; A47K 13/02
[58] Field of Search........... 4/10, 6, 239, 143, 185 B

[56] References Cited
UNITED STATES PATENTS

| | | | |
|---|---|---|---|
| 2,450,607 | 10/1948 | Oliver | 4/6 |
| 2,584,656 | 2/1952 | Anderson | 4/239 X |
| 3,538,518 | 11/1970 | Helke et al. | 4/10 |
| 3,648,296 | 3/1972 | Craft | 4/6 |
| 3,654,636 | 4/1972 | Restyanszki | 4/7 |
| 3,688,742 | 9/1972 | McGee | 4/239 UX |
| 3,757,738 | 9/1973 | Hall | 4;119/239 X;1 |

*Primary Examiner*—Richard E. Aegerter
*Assistant Examiner*—James E. Bryant, III

[57] ABSTRACT

An animal commode which fits into a conventional toilet bowl in such a manner to permit both animal and human use of the toilet facility without mutual interference, and which is flushed by the normal flushing of the toilet bowl.

9 Claims, 9 Drawing Figures

ANIMAL COMMODE

BACKGROUND OF THE INVENTION

The general purpose of this invention is to provide an animal commode for use indoors, primarily by cats and dogs, in combination with a conventional human toilet. The commode of the present invention offers many advantages over prior art devices, including (1) ease in training animals to use; (2) accessibility to the animals at nearly all times, including periods of human absence; (3) low cost; (4) reduced odor; (5) ease of cleaning and maintenance; (6) minimum interference to utilization of the facility by humans; (7) reduced demand and scheduling of human time to attend to the animal's needs; and (8) an improved environment through better disposal.

Among larger household pets, dogs and cats constitute the greatest number and thereby occasion the greatest problems in sanitation. When animals are mentioned herein, reference is primarily to dogs and cats. It has been estimated that there are about 26,000,000 dogs and 21,000,000 cats in the United States, and that the pet census increases about 3% annually. Most of these animals relieve themselves out of doors, on lawns, flowers, shrubbery, parklands, streets, and sidewalks, thereby creating unsanitary conditions greatly annoying and inconveniencing millions of humans, who are consequently limited in their own enjoyment of these amenities.

The inadequacy to date of solutions to the problem of disposing of animal excrement is well demonstrated by the fact that the practice of animals relieving themselves anywhere they please outdoors has not substantially changed in the many years animals have been associated with man. This situation was tolerable in a world of few people widely dispersed. In recent decades, however, the human population has not only increased greatly, but has tended to congregate in dense urban areas. Despite the increased population density, the reduced amount of land per human, the population of dogs and cats has increased correspondingly with man, or even more rapidly. Animals now compete intensively with humans for use of the ever-more-limited urban space.

Furthermore, the character of housing in urban areas has changed and is continuing to change from free-standing houses surrounded by garden space to apartments with little or no attached ground. The occupants of apartment dwellings, therefore, must release their pets to foul the public ways, parklands, and nearby private property where grass may yet be found. Obviously, it is apparent that something needs to be done to improve animal sanitation.

At the same time, circumstances for humans are not improving in the urban areas in terms of pet-care convenience. With the proportion of the population in the United States living in apartments steadily increasing, a larger number of persons each day face the frequently inconvenient requirements of walking a dog on the public streets until it relieves itself.

Large numbers of cats, meantime, have been provided alternative, albeit unsatisfactory, facilities indoors. Although many cats, when living arrangements make it possible, are permitted outside the home to relieve themselves, others now use a pan containing absorbent material. This method, although representing an improvement of recent years, is unsatisfactory in several respects, including expense, odor, and frequent cleanup. There is a growing need for a better solution for cats and their owners, in order that man and animal may continue their association with mutual satisfaction and benefit.

The state of the art with respect to animal sanitation is still primitive and has not kept up with the technological and social changes of man. There have been three major technological changes in history for the disposal of human wastes: (1) burying in ground or dumping into bodies of water; (2) water-borne sewage systems discharging into bodies of water, a development of the 19th century; and (3) sewage treatment before final discharge, a development of the 20th century still imperfectly implemented. There has been no comparable advance for pet animals. Their wastes, like wild animals, mostly continue to be deposited on the surface of the ground. It seems that even the inherited trait of animals to cover up their own feces by shoving dirt over it with their paws has become vestigial. In self-defense man is now attempting personally to clean up after animals, a new role, or at least a much more intensive effort, thrust on him by the increasingly unsatisfactory conditions. Then, to rid himself of the collected excrement, he includes it with other solid wastes for ultimate disposal in landfills, incinerators, or at sea, or throws it into the sewage system via a toilet.

It is apparent that pet animals have not been provided the means by which they may directly, through their own volition, utilize the new technological systems of waste disposal developed for urban societies. The effect of this has been to place the traditional man-animal relationship under a growing strain. Increasingly, man finds himself burdened with animal cares not historically his lot. To pet owners the time consumption, inconvenience, and unpleasantness of dealing with mature animals as if they were infants, because they are not provided with adequate means for self-care, are becoming more and more onerous. To the public the effects of the existing situation, not of the animals' own choosing, are becoming less and less tolerable. Clearly, man needs to make it possible for animals themselves to utilize technological advances in waste disposal. There is no reason to believe that the adaptability of pet animals is unequal to the task — it is man who has failed to date by not providing the means.

Dogs, although more numerous than cats in the United States, are in a less favorable sanitary position than cats. Not a single device for disposal of dog urine and feces is in general use by even a small fraction of the population. For lack of other methods, dogs confined in homes urinate and defecate on the floor (usually of the room in which they are penned for that purpose), hopefully on newspapers which have been placed over the floor. Even when newspapers have been placed on the floor, urine tends to run under them or soak through, so that even a daily replacement does not save the floor itself from becoming impregnated with urine and its odor.

In view of the totally unsatisfactory condition for dogs indoors, their owners, whenever possible, turn them out in yards and streets, often unattended, or walk them in the streets and parks, where they tend to defecate anywhere they please, except for the relatively infrequent owners who successfully lead their dogs to a gutter for the act. Some few dogs are trained to go to the gutter.

Cats are equipped by nature to be less of a sanitary problem than dogs. They are more fastidious about cleanliness. Given favorable circumstances, unfortunately usually lacking, they will sometimes cover their excreta with dirt or sand. Inside the house, however, they pose a problem similar to that of dogs — where will they defecate and urinate?

For many years an indoor sand box was often provided for cats. The problems resulting from these devices are amply illustrated in the patents awarded over many years to inventors who sought a better solution. The sand would tend to stay wet with urine, ultimately becoming coated with urine and feces and increasingly odoriferous. Inventions have attempted to alleviate these conditions in several ways, especially through means for letting the urine run through the sand to a pan beneath, and by providing for screening the sand while retaining the excrement for disposal.

These inventions, never popular, were generally outmoded by the development in recent years of a substitute for sand, being absorbent granules which soak up the urine while having a deodorant effect, and also serving to some extent in drying the feces. Periodically the owner rakes through the pan containing this material, commonly referred to as "litter", collecting and discarding the feces thereby recovered. The litter itself is generally discarded and replaced every few weeks when its absorptive capacity and deodorizing influence are nearly exhausted.

The pans of litter have the continuing disadvantage of requiring the owner to collect and discard the excrement, and to replace the litter. They emit an odor despite the absorptive quality of the litter, which odor grows in intensity with each visit of a cat. They are also expensive to maintain, the litter alone costs from $120 to $240 over a 10-year life of a cat, depending upon the degree of sanitation and odor-level tolerated by the owner and his cat (a cat refuses to use a neglected litter pan).

In exceptional cases, cats have been taught to sit on a toilet seat, dropping excreta into a toilet bowl. One company offers a training aid for that purpose. The proportion of such trained cats is very small. The training is difficult and the method has the accompanying disadvantage of often leaving traces of urine and feces on the toilet seat, from which it must be cleaned before human use. In other exceptional cases, cats use a bathtub, with the urine running into the trap and experiencing some dilution and the feces remaining in the tub until removed by the owner and thrown into a nearby toilet. The bathtub must then be scrubbed before human use. Neither of these methods are widely used and contain features and problems which do not encourage their widespread adoption.

In general, therefore, current methods for disposing of feline excreta are merely tolerated for lack of better ones. They would be quickly and gratefully abandoned for improved methods.

Most previously patented devices deal with sand or litter pans for cats and thus have little or no relevance to the present invention. U.S. Pat. No. 1,813,329, however, proposes a permanent animal toilet facility to be installed in the floor of a house as one would install current bathroom fixtures. It is obviously complicated and expensive and apparently has never been exploited commercially. U.S. Pat. No. 2,053,594 discloses an animal commode placed on a toilet bowl. However, it is not capable of being cleaned merely by flushing the toilet, and it must be removed from the toilet for use of the facility by humans. The combination animal-human commode disclosed in U.S. Pat. No. 3,757,738, issued Sept. 11, 1973, while superior to earlier devices, lacks a flush cleansing capability, and, although it need not be removed from the toilet for use of the facility by humans, it must nevertheless be first raised from a horizontal position to a substantially vertical position.

SUMMARY OF THE INVENTION

The present invention relates to an animal commode which fits into a conventional toilet bowl in such a manner to permit both animal and human use of the toilet facility without mutual interference, and which is flushed by the normal flushing of the toilet bowl.

DESCRIPTION OF THE PREFERRED EMBODIMENTS

Figure 1:
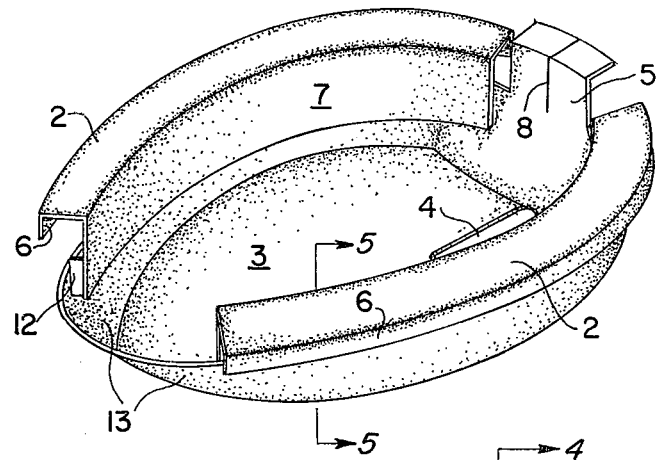
FIG. 1 is a perspective view illustrating the preferred embodiment of the animal commode of the present invention.
Figure 2:
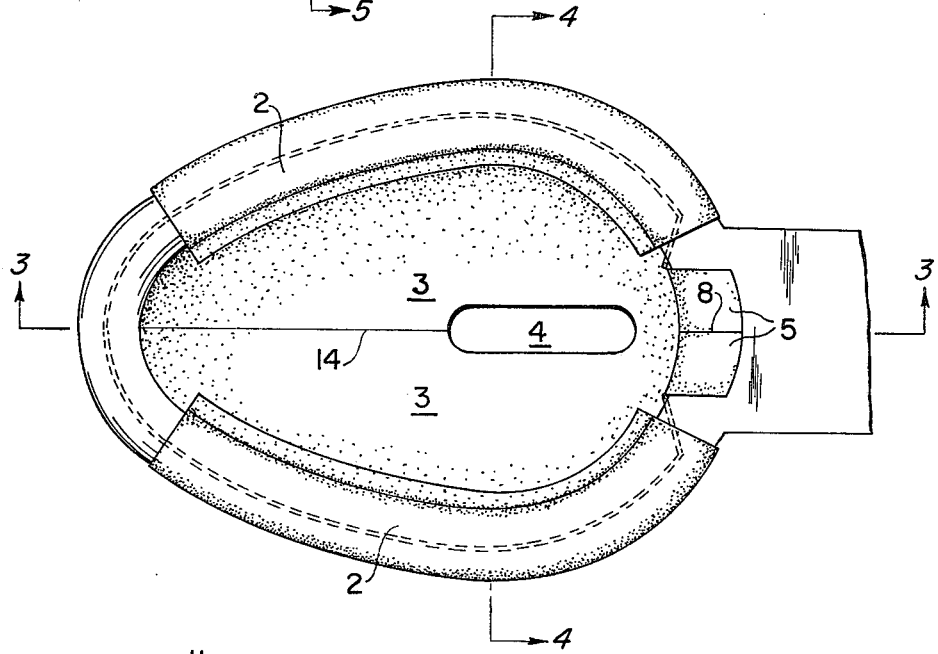
FIG. 2 is a top plan view of the preferred embodiment of the animal commode of the present invention positioned within the bowl of a conventional toilet facility.

Referring to FIGS. 1 and 2, the animal commode of the present invention consists of a sloping seat 3 with one or ore perforations 4 approximately located at the intersection of the centerline 14 and the compressible back 5. The seat 3 is secured to the top support 2 through the seat sidewalls 13 by support fins 12 which connect the seat sidewalls 13 with the top support inner edge 7. The animal commode is supported in the bowl by having the top support 2 rest on top of the rim 1 of the bowl. The top support outer edge 6 extends downward alongside the outside vertical face of the rim 1 to prevent the weight of a heavy animal from flexing the seat 3 causing the right and left top supports 2 to draw together. The top support 2 does not cover the rim 1 along the front or back in order to permit flexing of the seat sidewalls 13 so that the animal commode may fit in toilet bowls of somewhat varying sizes, and so that the seat sidewalls 13 fit snugly under the rim 1. At the rear of the animal commode is a compressible back 5 containing a vertical slit 8 to facilitate compression. The back 5 may be compressed sufficiently to pass the inner rim 1 of the bowl at the rear and then snap back to full length against the back of the bowl.

The large perforation 4 in the seat 3 is approximately 2 inches wide and 5 inches long, to permit feces, both animal and human, as well as urine, to pass therethrough to the bowl below. The seat 3 slopes on both sides toward the centerline 14, which itself slopes toward the perforation 4 to permit urine which does not pass directly through the perforation 4, as well as cleansing water, to drain into the bowl of the toilet.

Figure 3:
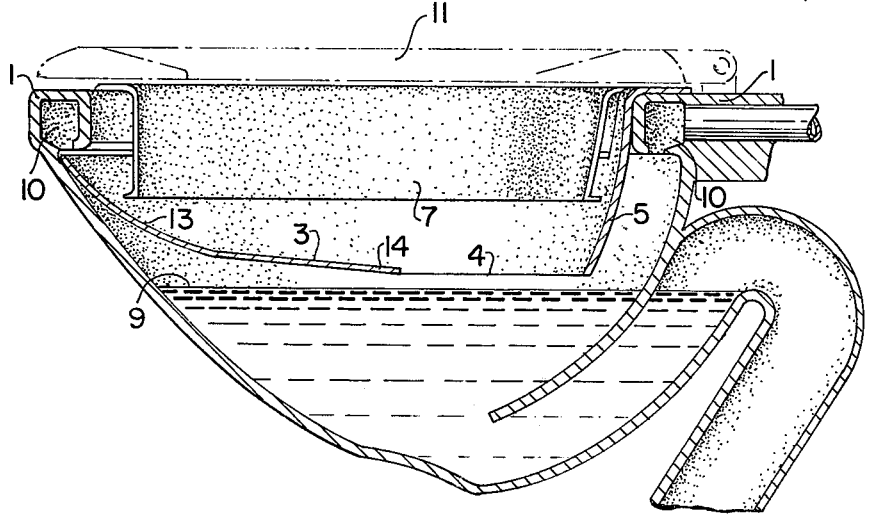
FIG. 3 is a cross-sectional view of the preferred embodiment of the animal commode of the present invention positioned within the bowl of a conventional toilet facility and taken along the line 3—3 of FIG. 2.
Figure 4:
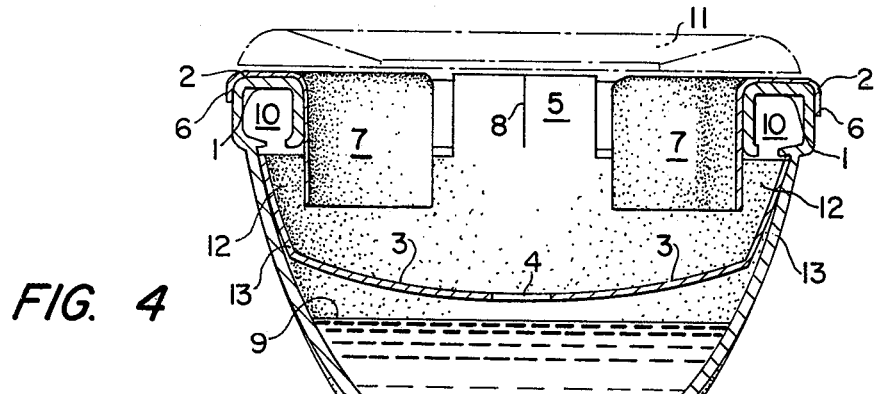
FIG. 4 is a cross-sectional view of the preferred embodiment of the animal commode of the present invention positioned within the bowl of a conventional toilet facility and taken along line 4—4 of FIG. 2.

Referring now to FIGS. 3 and 4, it can be seen that except for the rear the seat sidewalls 13 fit snugly under the rim 1 of the bowl so that flushing water from the holes 10 in the underside of the rim 1 flows down the seat sidewalls 13, across the seat 3 and through one or more perforations 4 in the seat 3, thereby cleansing it and disposing of any feces and traces of urine which may have been there.

Installation of the animal commode creates no interference to the use of the facility by humans since the toilet seat 11 may still be lowered to its normal position for use by humans, and the seat 3 of the animal commode conforms very closely to the shape of the inside of the toilet bowl. The seat 3 may be as little as ⅛ of an inch above the water level 9 if it is desired that during the flushing operation water rise through the perforation 4 to assist in the cleansing of the seat 3. The increase in water level during flushing may vary from ½ of an inch to ⅞ of an inch under the varying specifications of manufacturers of toilet bowls. If the flushing water from the holes 10 under the bowl rim 1 is deemed to have sufficient cleansing action, the seat 3 may be ⅝ of an inch to 1 inch above the normal water level 9, thereby maintaining the seat 3 above the highwater level during flushing.

Figure 5:
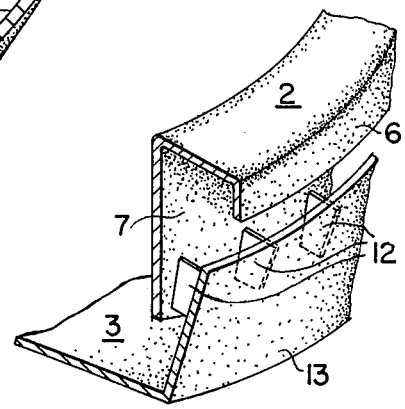
FIG. 5 is a perspective view of a portion of the preferred embodiment of the animal commode taken along line 5—5 of FIG. 1.

FIG. 5 provides a detailed view of the support fins 12 which connect the seat sidewalls 13 to the top support inner edge 7. The support fins 12 provide excellent support, but, because of their relatively small area in the horizontal plane, do not obstruct the flow of flushing water which flows in the area between the top support inner edge 7 and the seat sidewalls 13. In addition, the support fins 12 are rotated slightly from the vertical plane so that the flushing water flowing past the support fins 12 will flow down the seat 3 in a circular fashion thereby increasing the effectiveness of the flushing water's cleansing action.

The operation of the animal commode will now be described. The concept of all four embodiments of the animal commode is to enable an animal to share at will a modern sanitary convenience — the flush toilet — with humans, thereby obtaining the advantages of this technological advance for easy and inoffensive disposal of excreta, without in any way inconveniencing humans in their own use of the toilet. The animal commodes proposed do not allow a human to come in contact with animal wastes in his own normal use of the toilet.

After installation each animal is trained to use the animal commode. Placing a cat immediately on the animal commode upon bringing it home for the first time, especially if a sample of its urine is also placed in the animal commode, suffices for learning in most instances. If not, this process may be repeated, usually once or twice, until a cat learns its duty. Toilet training is quite easy for the cat family. For a cat the animal commode is very similar in size to a litter pan, but is more shallow and is placed above floor level. For a kitten, some intermediate step, such as a stool or ramp, may be needed temporarily to enable it to reach the animal commode. For the first few days of use the seat 3 of the animal commode may be sprinkled with litter, thereby appealing to the natural tendency of cats to seek sand, soft dirt, leaves, etc., as the place to defecate. If the cat is already accustomed to a litter pan, the presence of litter also will facilitate adaptation to the animal commode. During the first few days a cardboard may be placed over the perforation 4 in the seat 3 of the animal commode if desired to prevent excessive loss of the litter as well as to accustom the animal to the animal commode before disclosing the large perforation 4. Or, the animal commode may be manufactured to permit the owner to enlarge the perforation 4 for feces on a gradual basis as the animal becomes adapted to the animal commode.

Dogs require more repetition. After each "accident", a dog needs to be spoken to in a reproving voice and placed immediately in the animal commode. No litter is required, but specimens of its urine may be sprinkled on the seat 3 of the animal commode until the dog is trained. A scent is also available on the market for this same purpose. During training the bathroom may be utilized whenever the dog is to be penned in a room, thereby facilitating use of the animal commode. The agility of a dog in reaching the animal commode is usually even less than that of a cat. Therefore, a small stool or box next to the toilet may be needed initially so that a dog may easily reach the animal commode.

Dogs of 12 pounds or less should encounter no problem in the use of the animal commode. It is conceivable that dogs up to 20 pounds might be trained to use it.

Male dogs trained while puppies will continue to use the puppy position when urinating in the animal commode, even though employing the raised-leg position out of doors. An older male dog may require training for adaptation to the animal commode, although it is common for grown male dogs to continue to use the puppy position when in an open field lacking trees or other elevated objects.

It is purely discretionary whether an animal wishes to place all four paws on the seat 3 of the animal commode or only the back two with the front ones resting on the rim 1 of the bowl. If the latter position is used, larger animals may be accommodated.

The preferred position for an animal on the animal commode is that of facing the front of the toilet, straddling the centerline 14 of the animal commode and the large perforation 4 with its hind legs. For urination, however, it is of little consequence in which direction an animal faces, since the seat 3 of the animal commode is designed to avoid or minimize the wetting of the animal's feet with urine. A position over the large perforation 4 is preferable for defecation in order that feces will be immediately immersed in water, thereby reducing odor and keeping the seat 3 of the animal commode cleaner. However, even if deposited on the animal commode, flushing will remove the feces from the seat 3, and carry it through the perforation into the water of the bowl beneath. This may be done whenever the owner enters the bathroom and discovers the need. Therefore, this animal commode of the present invention does not require a highly trained animal for it to be fully useful. As long as the animal is taught to enter the animal commode this suffices for satisfactory use. No significant problems of animal adaptation are presented.

For humans the sharing of a toilet equipped with this animal commode is simple. When the toilet is available for animal use, the toilet seat 11 is up and resting against the flush tank. For a human, it is only necessary to lower the toilet seat 11. However, the toilet seat 11 may be left up if it is to be used as a urinal. If an animal has previously used the toilet, it may be flushed beforehand. Nothing more is required.

Cleansing of the animal commode may be accomplished with water and ordinary cleansing materials, perhaps using the same brush as normally used for a toilet bowl. Flushing the toilet will wet the animal commode, or the brush may be dipped into the water of the bowl through the large perforation 4 through which excrement escapes. Periodically, the animal commode may be easily removed for cleaning the bowl itself. Some persons may desire to maintain a deodorant and disinfectant in the bowl or in the flush tank, of which numerous varieties are on the market.

The animal commode of the present invention is in a ready position for animal use at all times when not in use by a human. It may also be made available to the animal while its owner is away from home. It does not require special floor space, necessitate inconvenient or time-consuming cleaning methods, involve difficult disposal means, or occasion large continuing supply expense.

Figure 6:
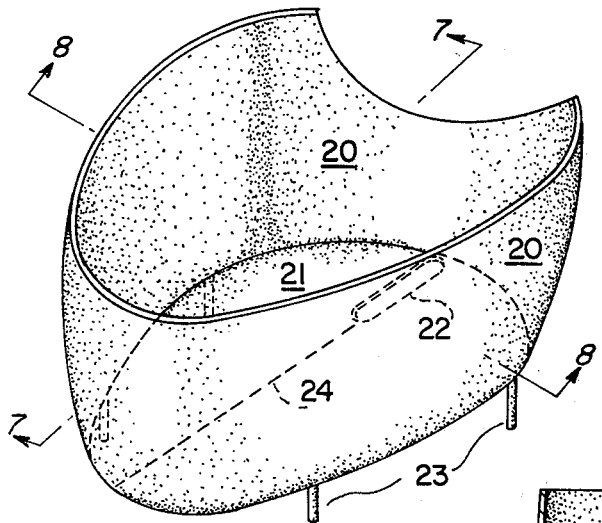
FIG. 6 is a perspective view of an alternative embodiment of the present invention.
Figure 7:
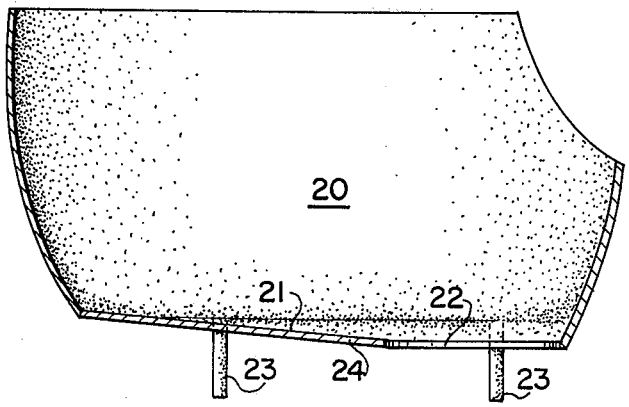
FIG. 7 is a cross-sectional view of an alternative embodiment taken along line 7—7 of FIG. 6.
Figure 8:
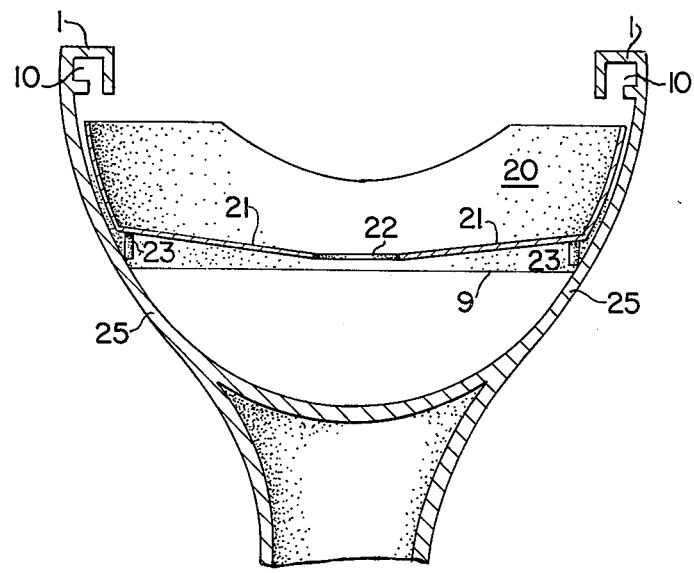
FIG. 8 is a cross-sectional view of an alternative embodiment of the present invention fitted into the bowl of a conventional toilet facility taken along line 8—8 of FIG. 6.

An alternative embodiment is illustrated in FIGS. 6, 7 and 8 consisting of a sloping seat 21 with one or more perforations 22 located at the rear intersection of the centerline 24 and the seat sidewall 20. This embodiment is essentially the same in construction and operation as the preferred embodiment of the animal commode except that, instead of being supported by a top support (2, FIG. 1), it is supported by four legs 23 attached to the bottom of the sloping seat 21 and resting upon the lower sides 25 of the toilet bowl. Like the preferred embodiment flushing water flows out the flush water inlets 10, down the sidewalls 20, across the sloping seat 21 and out the perforation 22 into the bowl.

Figure 9:
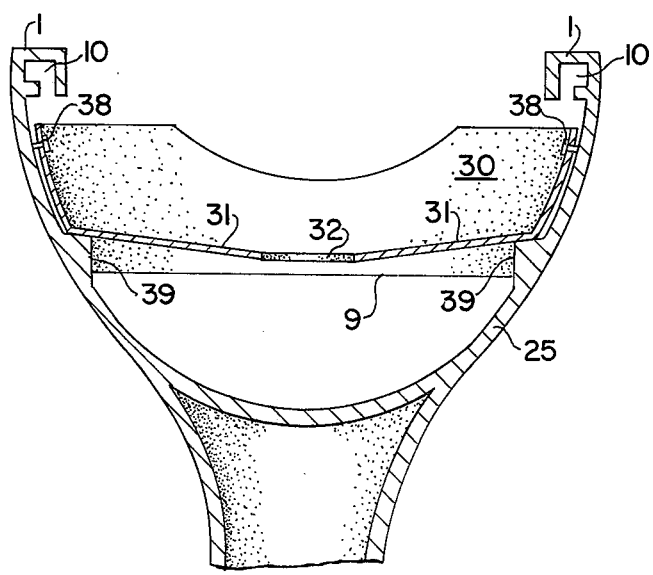
FIG. 9 is a cross-sectional view of an alternative embodiment of the present invention positioned within the bowl of a conventional toilet facility.

Still further embodiments are illustrated in FIG. 9 consisting of alternative means for supporting the animal commode, utilizing possible changes in the design of toilet bowls themselves, which would simplify the design of the animal commode and facilitate the placement and fastening of the animal commode within the toilet bowl. These embodiments comprise a sloping seat 31 with one or more perforations 32 located near the rear intersection of the seat 31 and the seat sidewall 30. These alternative embodiments are essentially the same in construction and operation as the preferred embodiment except that instead of being supported by a top support (2, FIG. 1), they are supported either by protuberances 39 on the inside of the bowl 25, the top level of which is at or near the normal water level 9, which directly support the sloping seat 31, or by hooks 38 mounted on the inside of the bowl 25 just under the rim 1 upon which the seat sidewalls 30 may be suspended.

I claim:

1. A toilet facility for use by both humans and animals comprising:

a human toilet facility provided with a bowl terminating upwardly in a rim, and a seat;

an animal toilet facility provided with a seat, at least one perforation within said seat, said seat further being provided with a sidewall extending upwardly so as to engage said bowl of said human toilet facility in the vicinity of said rim;

a support member resting on said rim of said human toilet facility and having a portion extending downwardly therefrom;

a compressible back position adjacent the rear of said sidewall of said seat of said animal toilet facility, said back being provided with both vertical and horizontal portions, an axial slit in said vertical portion and a radial slit in said horizontal portion; and a plurality of fins connecting said support member and said sidewall of said seat of said animal toilet facility.

2. A toilet facility as in claim 1, wherein said fins are inclined at an angle and spaced apart from each other.

3. A toilet facility as in claim 1, wherein a portion of said rim of said human toilet facility extends inwardly within said bowl thereof, and wherein said portion of said support member extending downwardly is spaced inwardly from said bowl.

4. A toilet facility as in claim 1, wherein said seat of said animal toilet facility includes walls sloping from the outer portions thereof downwardly intersecting at said perforation.

5. A toilet facility as in claim 1, wherein said support member further comprises a further portion extending downwardly along the outside of said bowl.

6. A toilet facility for use by both humans and animals, comprising:

a human toilet provided with a bowl terminating upwardly in a rim, a portion of said rim extending inwardly within said bowl; and an animal toilet facility provided with a seat having a top wall provided with at least one perforation therein, means mounting said seat such that said top wall thereof extends across the entire width of said bowl of said human toilet facility, said seat including a side wall conforming to the contour of said bowl and extending upwardly along said bowl to a point just below said portion of said rim extending inwardly within said bowl.

7. A toilet facility as in claim 6, wherein said means mounting said seat comprises a plurality of legs attached to the bottom of said seat of said animal toilet facility, said legs extending downwardly within said bowl of said human toilet facility to rest thereon.

8. A toilet facility as in claim 6, wherein said means mounting said seat comprises a plurality of protuberances extending inwardly from said bowl of said human toilet facility, said seat of said animal toilet facility resting upon said protuberances.

9. A toilet facility as in claim 6, wherein said means mounting said seat comprises a plurality of hooks mounted on the inside of said bowl adjacent said rim, said seat of said animal toilet facility being provided with openings, said hooks extending through said openings.

* * * * *